Figure 2:
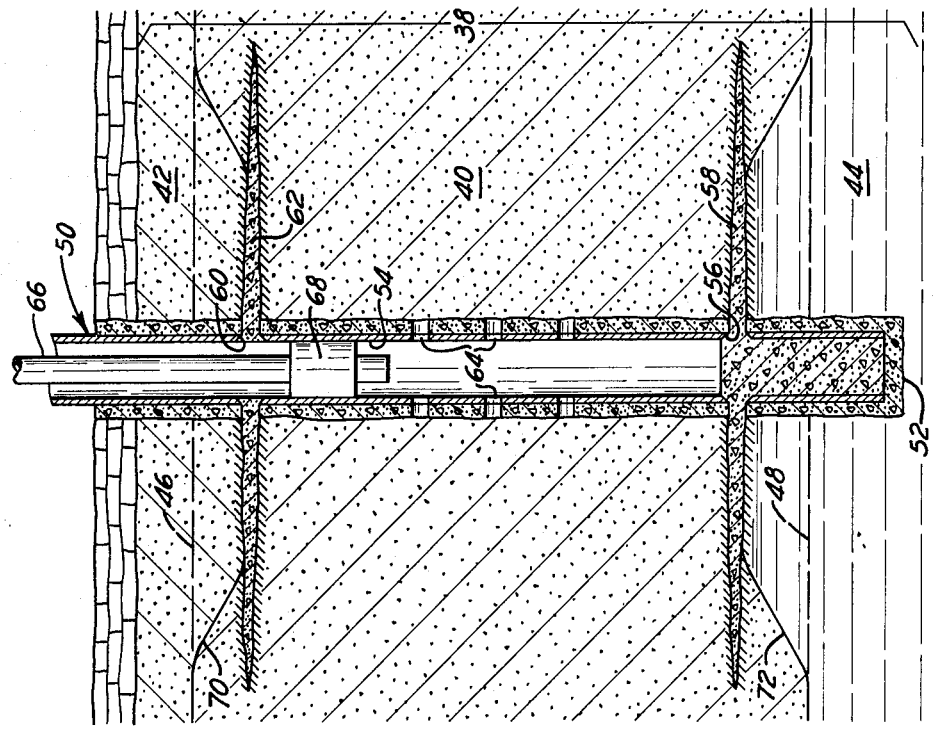

INVENTORS
JAY C. KARP
NICHOLAS MARUSOV

ATTORNEY

United States Patent Office

3,237,690
Patented Mar. 1, 1966

3,237,690
PROCESS FOR FORMING AN IMPERMEABLE BARRIER IN SUBSURFACE FORMATIONS
Jacy C. Karp, Wheaton, Md., and Nicholas Marusov, Verona, Pa., assignors to Gulf Research & Development Company, Pittsburgh, Pa., a corporation of Delaware
Filed Oct. 1, 1962, Ser. No. 227,146
7 Claims. (Cl. 166—29)

This invention relates to the production of oil and more particularly to the creation of an impermeable barrier for reducing the amount of gas or water produced by an oil well.

Frequently a water zone underlies the oil in a subsurface oil-bearing formation. When oil is produced from a well penetrating such a formation, the pressure drop from the formation into the well causes the water underlying the oil adjacent the well to form a cone extending upwardly above the normal water level. Upon continued production of oil from the well, the water cone may rise above the perforations through which the oil flows into the well and cause water to the produced with the oil. A somewhat similar problem may exist in an oil well in which the oil is below a gas cap extending across the top of the oil-bearing formation. The pressure drop from the oil-bearing formation into the well during production of oil may cause the gas above the oil to cone downwardly and enter the well through perforations located in the oil zone.

One of the methods that has been suggested to prevent the flow of water or gas into oil wells is to create a substantially horizontal barrier extending radially outward from the well into the oil zone of the oil-bearing formation. The barrier is located between the perforations through which oil flows into the well and the zone of the fluid which is to be blocked. The flow of water upwardly, or of gas downwardly, to the perforations through which the oil is produced is restricted by the barrier. Portland cement is commonly used as a barrier to prevent water or gas coning. Investigations of water and gas coning have shown that it may be desirable to form barriers extending as much as 100 feet radially from the well. Even though the permeability of the Portland cement forming the barrier is low relative to the oil-bearing formation, the large area of the barrier, the high pressure drop from the formation into the well that frequently exists, and the small thickness of the barrier all contribute toward substantial water flows through the barrier to the well. Special cements consisting principally of water-soluble, resin-forming compounds and Portland cement have been developed to reduce the permeability of cements. Such cements, available commercially as resin cement, are expensive and add substantially to the cost of cementing operations.

This invention resides in the creation in the oil zone of an oil-bearing subsurface formation of a thin, substantially horizontal, highly impermeable barrier of Portland cement bounded by strata of the formation which have had their permeability permanently destroyed by a plugging material. The barrier is created by forming a substantially horizontal fracture extending radially from the well for the desired distance and damaging the faces of the fracture with a plugging material which is resistant to oil and water. After the faces of the fracture have been damaged, a Portland cement slurry is pumped into the fracture and maintained in place until the cement has set to form a barrier.

The permanent damaging of the faces of the fracture can be accomplished by several methods. One method is to displace into the fracture and from the fracture into the faces of the fracture is resin-forming liquid which by virtue of polymerization, association, or condensation forms an impermeable oil-resistant and water-resistant solid resin. Suitable resin-forming liquids are phenol-formaldehyde and urea-formaldehyde, furfural-ketone, vinylidene chloride, styrene, monomers of acrylonitrile, etc. The resins that can be used are limited only in that they must be capable of being displaced into the openings in the formation and will set at conditions existing in the oil-bearing formation to plug the openings with a resin that is both oil resistant and water resistant.

The damaging of the formation can also be accomplished by displacing gelatinous materials which will gel to form impermeable gels blocking the pores. For example, a silica sol or a silica gel of relatively low viscosity may be displaced into the fracture and from the fracture into the exposed faces of the formation. The silica sol or low viscosity gel in time is then converted to an impermeable gel of sufficient rigidity to remain in place, which damages the permeability of the formation adjacent the fracture. One method of permanently damaging the formation with a siliceous material if the formation contains water is to displace a hydrolyzable material such as silicon tetrafluoride into the fracture and from the fracture into the adjacent formation. If necessary, water may be displaced from the fracture into the adjacent formation ahead of the silicon halide to provide the water necessary for hydrolysis.

It is not essential to the process of this invention that the faces of the fracture be damaged with a material which is bonded to the formation. A preferred material for destroying the permeability of the faces of the fracture is an aqueous suspension of silica flour, which is finely divided silica. Silica flour is available in several different grades which are suitable for use in this process. A typical screen analysis of a silica flour which has been used is 97 percent through a 230 mesh screen and 14 percent through a 325 mesh screen. Both screens are of the U.S. Sieve Series. The cement slurry displaced into the fracture after the faces of the fracture have been damaged will hold the silica flour particles in place in the passages of the formation adjacent the fracture.

Figure 1:
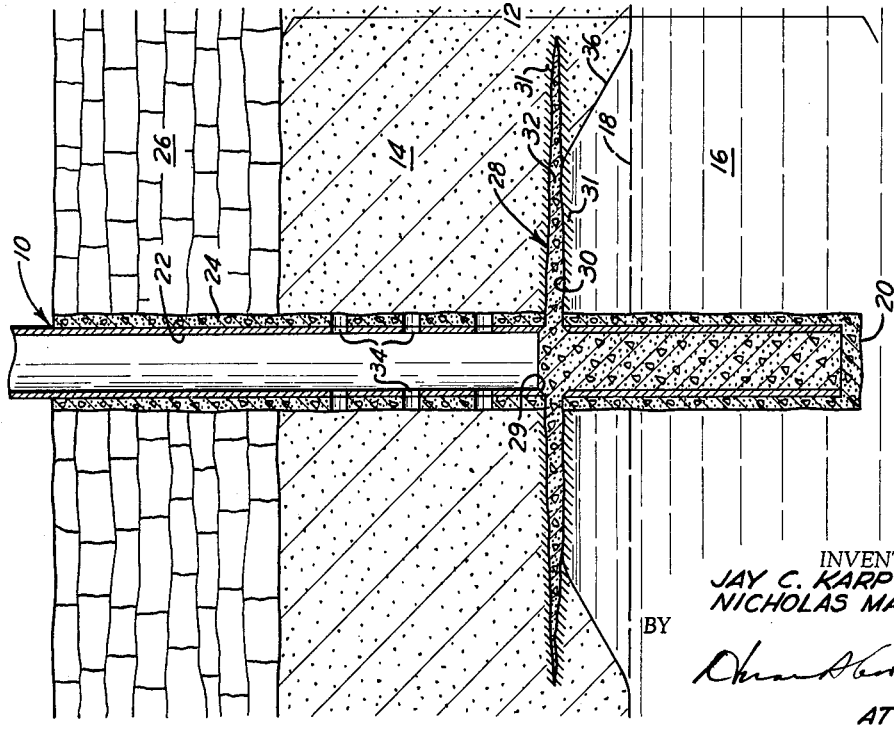

In the drawings:

FIGURE 1 is a diagrammatic vertical sectional view of a barrier created in accordance with this invention to prevent the coning of water into an oil well.

FIGURE 2 of the drawings is a diagrammatic vertical sectional view of a well having barriers created in accordance with this invention to prevent coning of both gas and water into an oil well.

Referring to FIGURE 1 of the drawings, an oil well indicated generally by reference numeral 10 is illustrated extending through an oil-bearing formation 12 which includes an oil zone 14 overlying a water zone 16. The normal oil-water interface is indicated by horizontal line 18. Well 10 is illustrated extending completely through the water zone 16 to a total depth 20. Casing 22 is run to total depth and cemented in place by a conventional cementing technique to provide a cement sheath 24 surrounding the casing. Overlying the oil zone 14 is cap rock 26.

A barrier, indicated generally by reference numeral 28, is constructed in accordance with the invention by first forming a horizontal fracture 30 extending radially outward from the well 10. A preferred method of forming the fracture is the method described in Patent No. 2,699,212 of Newton B. Dismukes suitably modified to create a horizontal rather than a vertical fracture. In accordance with the method described in that patent, a notch 29 is cut through the casing 22 and into the formation in the plane of the desired fracture, and thereafter a fracturing fluid is displaced into the notch under sufficient pressure to create the desired fracture 30. In a preferred fracturing method a liquid which penetrates the formation is displaced down the well by either an aqueous or oleaginous fracturing liquid to which a gelling agent has been added to increase its viscosity and thereby reduced the flow of fluid into the formation. Pressure adequate to overcome the overburden pressure and strength of the rock in oil zone 14 is applied to the liquid to initiate the fracture. Additional fracturing liquid is then displaced down the well into the fracture to extend it for the desired distance. If a resin is to be used to damage the faces of the fracture, a viscous resin-forming liquid may be used for the extension of the fracture. Some of the resin-forming liquid is forced into the formation adjacent the fracture to damage areas 31 adjacent the faces of the fracture. In the preferred form of the invention in which silica flour is used to damage the faces of the fracture, a susension of silica flour in water is used for extending the fracture the desired distance. The silica flour enters the openings in the faces of the fracture to plug the openings therein and reduce leak off of the liquid in which the silica flour is suspended during the extension of the fracture.

The liquid carrying the material for damaging the faces of the fracture is followed by a slurry of Portland cement which is displaced down the well and into the fracture to form a thin wafer 32 between the damaged fracture faces 31. The well is shut in for a period adequate to allow the cement in the fracture to set. In most instances a period adequate for the cement in the fracture 30 to set will be adequate for solidification of a resin-forming liquid. However, complete solidification of the resin-forming liquid before subsequent operations is not essential because displacement of the resin-forming liquid from the openings in the formation is prevented by the cement wafer 32. The barrier 28 consists of the permanently damaged areas 31 and the cement wafer 32.

After the cement has set in the fracture any excess of cement within the casing 22 is drilled from the casing and the casing perforated, as indicated by reference numerals 34 in the oil-bearing zone 14 above the barrier 28. The well is then produced by any of the conventional means. If pumping is necessary a pump is installed in the casing 22 above the level of the barrier 28 and oil flowing into the casing through perforations 34 is lifted from the well. If the pressure of the oil-bearing formation 12 is adequate, oil flowing through perforations 34 into casing 22 may flow directly by its own energy to the wellhead.

As production of oil from the well continues, the pressure within the formation immediately adjacent the well above the barrier 28 becomes less than the pressure in the formation at a substantial distance from the well. Water adjacent the well tends to cone upwardly toward the perforations 34 whereby the oil-water contact rises from level 18 to form the cone indicated by reference numeral 36. Because fluids below the barrier 28 cannot flow readily into the well, they are at substantially the formation pressure and, hence, there is a substantial pressure drop across the barrier 28. The permanent damaging of the faces of the fracture in accordance with this invention results in a very much greater resistance to flow from the undamaged formation below the barrier through the barrier 28 to the undamaged portion of the formation above the barrier than is obtained by a Portland cement wafer alone, with the result that production of water with the oil is largely eliminated.

The greatly reduced permeability of the barrier construction in accordance with this invention compared to the usual cement barrier is illustrated by the following tests.

Three Berea sandstone cores one inch in diameter and approximately 1¼ inches in length were cast into an epoxy resin to form a test core having a surrounding plastic wall ¼ inch thick. The ends of the core were cut off on a diamond saw and 3/16 inch of the Berea sandstone in the core was machined from one end of the assembly. Then the prepared core samples were placed in a cylindrical core holder and the air permeability and water permeability of the cores were determined by passing fluids of known properties through the cores at a measured pressure differential in accordance with standard techniques for determining permeabilities. The core samples were then tested as follows:

*Core No. 1.*—The 3/16 inch cavity in the end of the core sample was filled with a neat cement slurry containing 100 parts of Portland cement and 46 parts of water, by weight. A pressure of 500 pounds per square inch was exerted on the cement which caused 125 cc. of filtrate to filter through the core. The pressure of 500 pounds per square inch was maintained on the cement slurry for two days. The core was removed from the holder and the end of the core was cut on a diamond saw to leave a layer of cement ⅛ inch thick on the core sample. The core was then placed in the core holder and its permeability to water obtained.

*Core No. 2.*—This core was treated in the same manner as Core No. 1 except that 0.1 pound per gallon of silica flour was added to the cement mixtures.

*Core No. 3.*—This core was treated the same as Core No. 1 except that the face of the core was damaged by exposing one face of the core to a suspension of 0.1 part per gallon silica flour in water at a pressure of 500 pounds for a period of 30 minutes. The permeability of the cores before and after the treatments are set forth in Table I.

*Table I*

| Test No. | Core Permeability, md. | | Effective Cement Layer Permeability (md.) |
|---|---|---|---|
| | Air | Water | |
| 1 | 310 | 290 | 0.07 |
| 2 | 280 | 250 | 0.05 |
| 3 | 270 | 250 | 0.002 |

It will be noticed from Table I that the permeability of the core in which the face had been damaged with silica flour was approximately 1/35 the permeability of the neat cement layer and 1/25 the permeability of the layer of cement containing the silica flour. In actual operation in a well, the reduction in water flow through a barrier constructed in accordance with this invention would be even greater because there would be two damaged faces whereas in the test described above, only one face of the formation was damaged.

In a specific embodiment of this invention, a well is drilled completely through an oil-bearing formation 30 feet thick having its lower boundary at a depth of 3,505 feet. The normal oil-water contact in the formation is at a depth of 3,498 feet. Casing is set in the well through the oil-bearing formation and is cemented in place. A notch is cut through the casing and surrounding cement sheath at a depth of 3,488 feet by means of an explosive casing cutter. Water is displaced down the well and is followed by 500 barrels of a fracturing liquid consisting of water to which a commercial gelling agent has been added in an amount to give the fracturing liquid a Marsh Funnel viscosity of 190 seconds. Pressure on the fracturing liquid is increased to fracture the formation and the fracturing liquid is followed by 500 barrels of water containing 2 pounds per gallon of silica flour to damage the faces of the fracture. The suspension of silica flour is followed by a 46 percent Portland cement slurry which is displaced into the fracture, and pressure is maintained on the well until the cement slurry sets. After the cement has set, the plug of cement is drilled from the well and the well is perforated through the interval of 3,480 to 3,485 feet.

In the embodiment of the invention illustrated in FIGURE 2, an oil-bearing formation 38 is illustrated having an oil zone 40 between an overlying gas cap 42 and an underlying water zone 44. The normal contact level between the gas cap and the oil zone is indicated by line 46 and the normal contact level between the oil and the water is indicated by line 48.

A well indicated generally by reference numeral 50 is drilled to a total depth 52 either into or through the water zone 44. Casing 54 is run into the well to total depth and cemented in place by conventional cementing techniques. A horizontal notch 56 is cut in casing 54 in the oil zone 40 above the normal oil-water contact 48. A horizontal fracture is created, the faces of the fracture are permanently damaged, and the fracture filled with a neat cement slurry to create a barrier 58 in the manner described with reference to the embodiment illustrated in FIGURE 1. Thereafter a notch is cut in the casing at 60 in the oil zone below the normal oil-gas contact 46, and a horizontal barrier 62 is created extending from the notch 60 in accordance with this invention.

The plug of cement left in casing 54 as a result of the creation of the barriers 58 and 62 is drilled from the casing through the interval between the two barriers. Thereafter perforations 64 are created in casing 54 by shaped charges or perforating guns by conventional perforating techniques. If desired, tubing 66 can then be run into the well and and set in a packer 68 for delivery of oil from the well through the tubing.

During the production of oil from the well illustrated in FIGURE 2, the lower pressure adjacent the well will cause the gas-oil contact 46 to move downwardly as indicated by line 70 to the barrier 62. Similarly, the water cones upwardly and thereby causes the oil-water contact to move upwardly above the normal contact line 48 to a position indicated by line 72 against a portion of the bottom of the barriers 58. The very low permeability of the barriers 58 and 62 prevents the flow of substantial quantities of water or gas into the oil zone 40 and through the perforations 64.

The unique process of this invention in which a cement wafer is created in a fracture, the faces of which have been permanently damaged, results in a barrier of very low permeability. The barrier, which consists of two damaged areas of the formation adjacent the faces of the fracture and the wafer of cement within the fracture, can be created at a cost much lower than is possible by use of resins or resin cements to obtain the desired low permability. Resin cements composed of Portland cement and a water-soluble, resin-forming composition that are available commerically for the formation of barriers of low permeability cost from 15 to as much as 30 times as much per gallon as neat Portland cement slurries. If a barrier having a radius of 75 feet is constructed in accordance with this invention by damaging the faces of the fracture with a resin followed by filling the fracture with a neat cement slurry, a saving in cost of approximately $4,500 over the cost of damaging the faces and filling the practure with the resin alone can be obtained with substantially no increase in the permeability of the barrier.

As indicated by a comparison of Tests Nos. 2 and 3, damaging the face of the fracture with silica flour, the preferred composition for causing the permanent damage to the fracture faces, is far more effective than incorporating the silica flour in the cement. A further advantage of the process of this invention is that the initial damaging of the fracture faces prevents loss of water from the cement slurry and thereby greatly reduces the chances of the slurry becoming dewatered and failing to fill the fracture.

We claim:

1. A method of creating a barrier for reducing the flow of fluid other than oil into a well penetrating a formation having an oil zone adjacent a zone of fluid other than oil comprising forming a substantially horizontal fracture extending into the oil zone from the well, displacing through the faces of the fracture a material insoluble in oil and in water to reduce the permeability of the formation adjacent the fracture, thereafter displacing a slurry of Portland cement into the fracture, and holding the slurry of Portland cement in the fracture until the Portland cements sets.

2. A method of creating a barrier preventing flow of a fluid other than oil into a well penetrating a formation having an oil zone and a zone of the fluid other than oil adjacent thereto whereby an interface between the oil and the fluid other than oil exists in the formation, comprising forming a substantially horizontal fracture extending from the well into the oil zone adjacent said interface, displacing a resin-forming liquid into the fracture and from the fracture into the faces of the formation, maintaining pressure on the well and displacing a Portland cement slurry into the fracture, and shutting the well in whereby the Portland cement sets in the fracture and the resin-forming liquid forms a solid resin in pores of the formation adjacent the cement to create a substantially horizontal barrier of low permeability.

3. A method of creating a barrier reducing flow of a fluid other than oil into a well penetrating a subsurface formation having an oil zone and a zone of a fluid other than oil adjacent to said oil zone whereby there is an interface of the oil and the fluid other than oil in the subsurface formation comprising forming a substantially horizontal fracture extending from the well through the oil zone adjacent the interface, displacing a suspension of finely divided silica into the fracture and into the formation adjacent the faces of the fracture, thereafter maintaining pressure on the well to hold the finely divided silica in place and displacing a slurry of Portland cement into the fracture, and maintaining pressure on the cement slurry until the cement sets.

4. A method of creating a barrier to the flow of fluid other than oil into an oil well from a zone adjacent to the oil zone comprising forming a fracture extending into said oil zone adjacent to the zone containing said other fluid with a fracturing liquid containing a material insoluble in oil and in water which enters and plugs the pores of the formations facing the fracture whereby said formations are rendered substantially impermeable to water, displacing a water slurry of Portland cement under pressure into the fracture whereby the Portland cement slurry substantially retains its water, and holding the slurry of Portland cement in the fracture until the Portland cement sets.

5. A method in accordance with claim 4 in which said oil and water insoluble material is finely divided silica.

6. A three-layer barrier to the flow of fluid other than oil into an oil well from a zone adjacent to the oil zone which comprises a layer of substantially fully cured neat Portland cement occupying an artificially produced fracture extending into said oil zone adjacent to the zone containing said other fluid, and a substantially impermeable layer adjacent each surface of the Portland cement layer consisting of the formation adjacent said fracture having its pores plugged with a material insoluble in oil and in water.

7. A three-layer barrier to the flow of fluid other than oil into an oil well from a zone adjacent to the oil zone which comprises a layer of substantially fully cured neat Portland cement occupying an artificially produced fracture extending into said oil zone adjacent to the zone containing said other fluid, and a substantially impermeable layer adjacent each surface of the Portland cement layer consisting of the formation adjacent said fracture having its pores plugged with finely divided silica, said finely divided silica held in said pores by the Portland cement layer.

References Cited by the Examiner

UNITED STATES PATENTS

| | | | |
|---|---|---|---|
| 2,368,424 | 1/1945 | Reistle | 166—42.1 X |
| 2,492,212 | 12/1949 | Dailey | 166—33 X |
| 3,053,675 | 9/1962 | Rehmar et al. | 166—29 X |

CHARLES E. O'CONNELL, *Primary Examiner.*

UNITED STATES PATENT OFFICE

CERTIFICATE OF CORRECTION

Patent No. 3,237,690        March 1, 1966

Jay C. Karp et al.

It is hereby certified that error appears in the above numbered patent requiring correction and that the said Letters Patent should read as corrected below.

In the grant, line 1, and in the heading to the printed specification, line 4, name of inventor, for "Jacy C. Karp", each occurrence, read -- Jay C. Karp --; column 1, line 23, for "the", second occurrence, read -- be --; column 3, line 19, for "reduced" read -- reduce --; line 31, for "susension" read -- suspension --; column 5, line 73, for "practure" read -- fracture --; column 6, line 2, after "damaging" insert -- of --; line 22, for "cements" read -- cement --.

Signed and sealed this 7th day of February 1967.

(SEAL)

Attest:

ERNEST W. SWIDER
Attesting Officer

EDWARD J. BRENNER
Commissioner of Patents